(12) United States Patent
Nishiyama et al.

(10) Patent No.: US 7,821,797 B2
(45) Date of Patent: Oct. 26, 2010

(54) ISOLATED DC-DC CONVERTER

(75) Inventors: Takayoshi Nishiyama, Takatsuki (JP);
Koichi Ueki, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/688,041

(22) Filed: Jan. 15, 2010

(65) Prior Publication Data

US 2010/0103703 A1    Apr. 29, 2010

Related U.S. Application Data

(63) Continuation of application No. PCT/JP2008/062882, filed on Jul. 17, 2008.

(30) Foreign Application Priority Data

Jul. 18, 2007    (JP) .............................. 2007-186440

(51) Int. Cl.
*H02M 3/335* (2006.01)

(52) U.S. Cl. ...................... 363/17; 363/21.15

(58) Field of Classification Search ................... 363/17, 363/21.15
See application file for complete search history.

(56) References Cited

U.S. PATENT DOCUMENTS

| | | | |
|---|---|---|---|
| 6,944,034 B1* | 9/2005 | Shteynberg et al. | 363/17 |
| 7,102,334 B2* | 9/2006 | Wiegand et al. | 323/223 |
| 2006/0119181 A1 | 6/2006 | Namba et al. | |
| 2006/0181252 A1 | 8/2006 | Yoshida et al. | |
| 2007/0025125 A1* | 2/2007 | Nakahori et al. | 363/56.02 |
| 2010/0026208 A1* | 2/2010 | Shteynberg et al. | 315/297 |

FOREIGN PATENT DOCUMENTS

| | | |
|---|---|---|
| EP | 0 942 518 A2 | 9/1999 |
| JP | 58-044614 U | 3/1983 |
| JP | 06-253534 A | 9/1994 |
| JP | 11-341801 A | 12/1999 |
| JP | 2000-116027 A | 4/2000 |
| JP | 2000-350462 A | 12/2000 |
| JP | 2003-523711 A | 8/2003 |

(Continued)

OTHER PUBLICATIONS

Official Communication issued in International Patent Application No. PCT/JP2008/062882, mailed on Oct. 14, 2008.

*Primary Examiner*—Bao Q Vu
*Assistant Examiner*—Jue Zhang
(74) *Attorney, Agent, or Firm*—Keating & Bennett, LLP

(57) ABSTRACT

A switching circuit arranged to switch the input of an input power supply is connected to a primary winding of a transformer at a primary side of the transformer. A digital control circuit including a switching controller arranged to output control pulses to the switching circuit and a rectifying/smoothing circuit connected to secondary windings of the transformer are disposed at a secondary side of the transformer. The digital control circuit outputs the control pulses via a pulse transformer, calculates the input power-supply voltage on the basis of the on-duty cycle of the control pulses, the output voltage, and the ratio of the number of turns of the primary winding to the number of turns of the secondary windings of the transformer, and performs converter control in accordance with the calculated input power-supply voltage.

7 Claims, 4 Drawing Sheets

FOREIGN PATENT DOCUMENTS

| | | |
|---|---|---|
| JP | 2003-259640 A | 9/2003 |
| JP | 2005-198430 A | 7/2005 |
| JP | 2006-136146 A | 5/2006 |
| JP | 2006-164727 A | 6/2006 |
| WO | 01/61832 A2 | 8/2001 |

* cited by examiner

US 7,821,797 B2

ISOLATED DC-DC CONVERTER

BACKGROUND OF THE INVENTION

1. Field of the Invention

The present invention relates to isolated DC-DC converters that digitally control switching circuits.

2. Description of the Related Art

Japanese Unexamined Patent Application Publication No. 2000-116027 describes a known isolated DC-DC converter for digital control including a control circuit configured using a microcomputer or a DSP (digital signal processor) to maintain the output voltage at a secondary side at a constant value.

Since the microcomputer or the DSP can communicate signals and data with an external circuit, the performance of the converter can be improved when the microcomputer or the DSP is used for switching control.

Herein, FIG. 1 illustrates a basic structure of the isolated DC-DC converter described in Japanese Unexamined Patent Application Publication No. 2000-116027.

In FIG. 1, a switching element 211 and a resistor 257 for current detection are connected in series to a primary winding of a transformer T10. The switching element 211 is configured to receive driving signals from a DSP 903. A rectifying/smoothing circuit 208 is connected to a secondary winding of the transformer T10. The DSP 903 includes a photocoupler 702a, 702b that detects the output voltage of the rectifying/smoothing circuit 208 and transmits the voltage to a primary side of the transformer while isolating a secondary side of the transformer from the primary side and an A/D converter 255 that converts the output voltage into digital data. The DSP 903 reads the values. Moreover, the DSP 903 reads the dropped voltage of the resistor 257 for current detection. A photodetector 902 (that receives infrared signals from a remote controller) is disposed at the primary side of the transformer T10, and the DSP 903 reads output signals from the photodetector 902.

In this manner, the DSP 903 controls the switching of the switching element 211 such that the output voltage is maintained at a constant value, and protects the converter from overcurrent in accordance with the output voltage of the resistor 257. Furthermore, the DSP 903, for example, starts and stops the converter in accordance with the signals from the photodetector 902.

Since a known isolated DC-DC converter maintains the output voltage at the secondary side of a transformer at a constant value by switching a switching element at the primary side of the transformer, the converter generally has a digital controller (a microcomputer or a DSP) disposed at the primary side as shown in FIG. 1. Since the primary side and the secondary side need to be isolated from each other in the isolated converter, signals of the output voltage detected at the secondary side are transmitted to the primary side using isolation means such as a photocoupler, and are fed back to the digital controller so that the switching element at the primary side is controlled.

However, when the output voltage at the secondary side is transmitted to the primary side using a photocoupler, problems such as delay in response and deterioration with time may arise. Moreover, when the digital controller is disposed at the primary side, the digital controller cannot communicate with a load (electronic device) to which the output voltage at the secondary side is applied. That is, the digital controller using a microcomputer or a DSP as a controller can constantly send information such as the state of a power supply unit to the electronic device serving as the load, and can receive information such as the load state of the electronic device for constant current control, constant voltage control, constant power control, and the like, without a time lag. However, when the digital controller is disposed at the primary side, the above-described advantages cannot be obtained.

As a matter of course, isolation means such as a photocoupler or a pulse transformer technically allows the above-described communication. However, a number of photocouplers, pulse transformers, or the like are required in accordance with the number of ports for signals that are mutually communicated, which is impractical from the viewpoint of reducing cost and saving space.

Conversely, when the digital controller is disposed at the secondary side, a problem associated with detection of the input voltage arises. That is, since the input voltage fluctuates under normal conditions, the input voltage needs to be detected at the secondary side via the above-described isolation means. Furthermore, another isolation means is required for transmitting control signals for the switching element at the primary side. This disadvantageously requires an increase in the size of the converter.

As described above, since the values to be detected (for example, the input voltage and the output voltage) exist at both the primary and secondary sides, signals need to be transmitted using isolation means such as photocouplers or pulse transformers according to the known technology regardless of whether the digital controller is disposed at the primary side or the secondary side. This causes problems such as delay in response, deterioration with time, and an increase in the size of the converter.

SUMMARY OF THE INVENTION

Preferred embodiments of the present invention provide an isolated DC-DC converter capable of solving the above-described problems such as delay in response, deterioration with time, and an increase in the size of the converter.

An isolated DC-DC converter according to a preferred embodiment of the present invention includes a transformer including at least a primary winding and a secondary winding, a switching circuit connected to the primary winding of the transformer and arranged to switch an input power supply, a digital control circuit including a switching controller arranged to output control pulses to the switching circuit, a rectifying/smoothing circuit arranged to rectify and smooth an alternating voltage generated at the secondary winding of the transformer by switching the switching circuit and outputting the voltage to an output terminal, an output-voltage detecting circuit arranged to detect the output voltage output via the rectifying/smoothing circuit, and an isolation member arranged to transmit the control pulses output from the digital control circuit to a primary side of the transformer while isolating a secondary side of the transformer from the primary side. The digital control circuit is disposed at the secondary side of the transformer, and includes a receiving member arranged to receive signals detected by the output-voltage detecting circuit or digital values of the detected signals, and an input power-supply voltage calculating member arranged to calculate the voltage of the input power supply from at least the on-duty cycle of the control pulses, the output voltage, and the ratio of the number of turns of the primary winding to the number of turns of the secondary winding of the transformer.

It is preferred that the switching circuit is a full-bridge circuit, for example.

The isolation member may preferably include a pulse transformer arranged to transmit waveforms obtained by differentiating the control pulses to the primary side, and to transmit only rising portions and falling portions of the control pulses to the primary side.

The isolation member may also preferably include a photocoupler.

The digital control circuit preferably includes a port arranged to communicate with a load circuit connected to the output terminal.

The digital control circuit preferably includes a DSP.

The isolated DC-DC converter preferably further includes a current detector arranged to detect current flowing in the primary side of the transformer. The digital control circuit preferably includes a constant voltage controller programmed to perform constant voltage control in which the on-duty cycle is controlled such that the output voltage is maintained at a constant value, a constant current controller programmed to perform constant current control in which the on-duty cycle is controlled such that output current flowing in the output terminal is maintained at a constant value on the basis of the input power-supply voltage or the value of the output voltage, the current detected by the current detector, and the ratio of the number of turns of the primary winding to the number of turns of the secondary winding of the transformer, an overcurrent protection member arranged to switch the control mode from the constant voltage control to the constant current control when the current detected by the current detector is higher than or equal to a predetermined value, and a voltage retaining member arranged to retain the input power-supply voltage that exists when it is determined that the current detected by the current detector is higher than or equal to the predetermined value.

When the digital control circuit is disposed at the secondary side, the isolation member is provided to detect the input voltage according to the known technology. However, the on-duty cycle of the control pulse is a known quantity since the digital control circuit provides the control pulses to the switching circuit at the primary side. Therefore, the input power-supply voltage calculating member can approximately calculate the input voltage from the ratio of the number of turns of the primary winding to the number of turns of the secondary winding, the detected output voltage, and the on-duty cycle of the control pulses to the switching elements, and no isolation member is required to directly detect the input voltage. As a result, problems such as delay in response, deterioration with time, and an increase in the size of the converter can be prevented and eliminated.

Moreover, it is difficult for a photocoupler to transmit voltage signals serving as analog signals as in the known technology, and in addition, the photocoupler markedly deteriorates with time. However, preferred embodiments of the present invention can solve these problems since only pulse waves for indicating on/off timings of the switching elements need to be transmitted from the secondary side to the switching circuit at the primary side according to preferred embodiments of the present invention. That is, both the pulse transformer and the photocoupler do not easily deteriorate with time when pulse signals are transmitted.

Moreover, when the digital control circuit is disposed at the primary side as in the known technology, the number of pulse transformers or photocouplers that communicate with the secondary side is increased. However, the number of pulse transformers or photocouplers can be markedly reduced according to preferred embodiments of the present invention.

When the switching circuit is a full-bridge circuit, for example, the input power-supply voltage is substantially in proportion to the output voltage. Accordingly, the input power-supply voltage can be determined with high accuracy.

Since the isolation member needs to transmit only the control pulses output from the digital control circuit to the primary side, a pulse transformer with low inductance can be used as the isolation member. This can lead to a reduction in the size of the converter.

Since the isolation member needs to transmit only the control pulses output from the digital control circuit to the primary side, the isolation member does not easily deteriorate with time even when a photocoupler is used as the isolation member.

Since the digital control circuit includes the port for communicating with the load circuit connected to the output terminal, the digital control circuit can communicate with the load circuit while the digital control circuit is not isolated from the load circuit. This allows control without delay in response.

When the digital control circuit is a DSP, the control pulses to the switching circuit can be directly controlled. This allows highly accurate timing control without any factors causing variations in the circuit constant of the analog circuit.

The output current for the constant current control is determined on the basis of the input power-supply voltage or the output voltage, the current detected by the current detector, and the ratio of the number of turns of the primary winding to the number of turns of the secondary winding of the transformer. The overcurrent protection member switches the control mode from the constant voltage control to the constant current control when the output current becomes higher than or equal to the predetermined value. The voltage retaining member retains the input power-supply voltage, the output voltage, or a correction value for overcurrent protection in accordance with the input power-supply voltage existing when it is determined that the output current becomes higher than or equal to the predetermined value. With this unique structure, an accurate overcurrent protection can be performed in accordance with the input power-supply voltage even in the overcurrent protection state.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
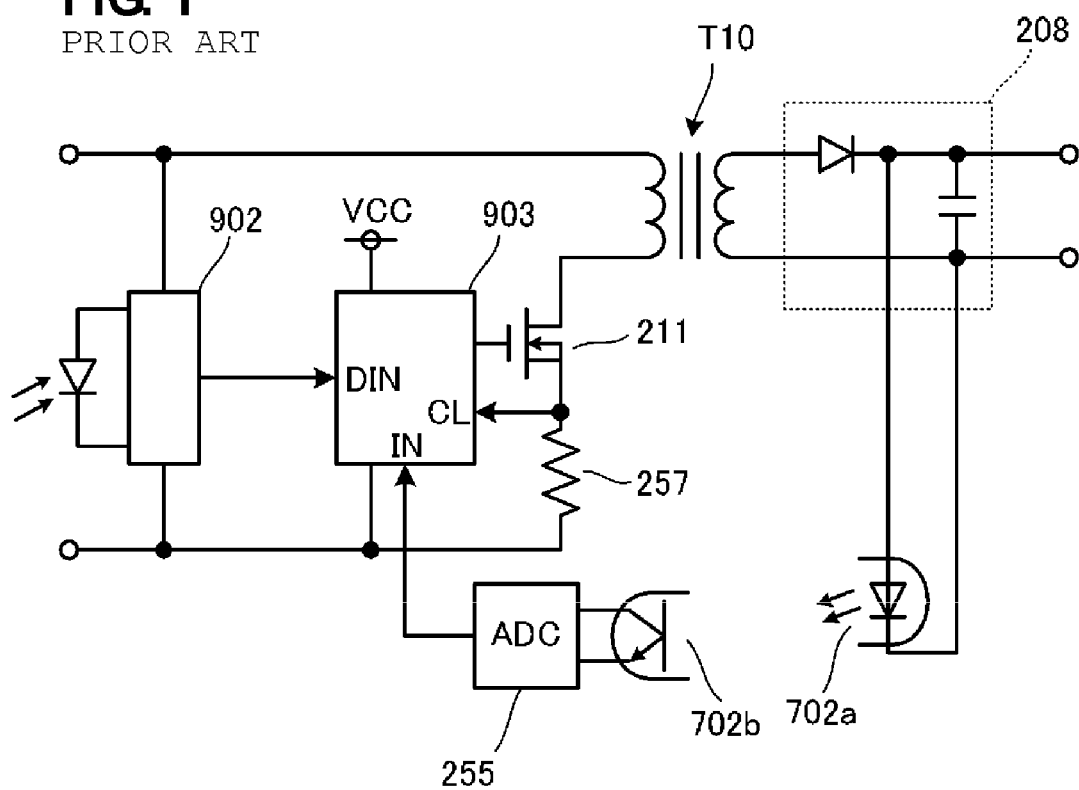
FIG. 1 is a schematic view of an isolated DC-DC converter described in Japanese Unexamined Patent Application Publication No. 2000-116027.
Figure 2:
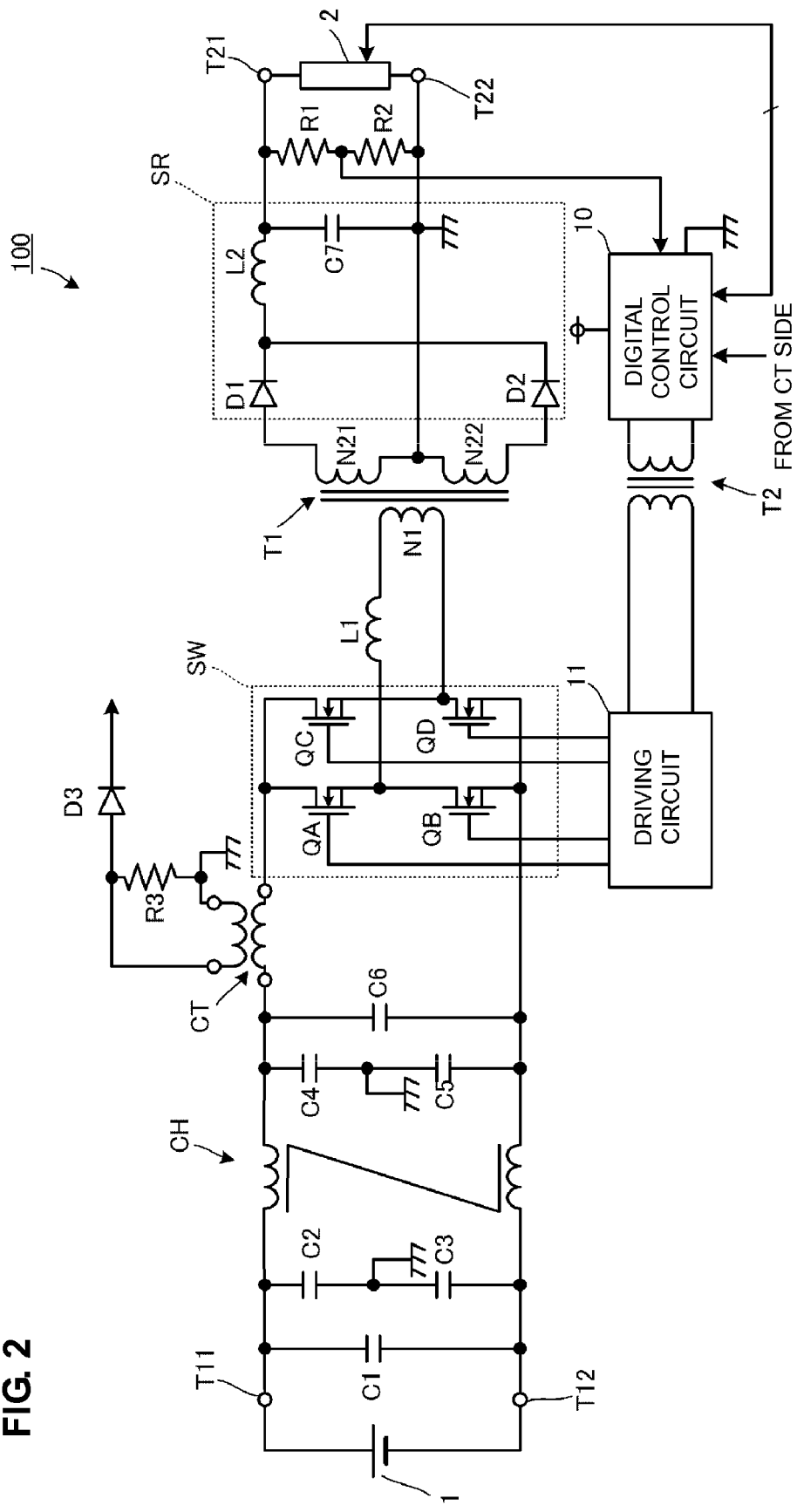
FIG. 2 is a circuit diagram of an isolated DC-DC converter according to a preferred embodiment of the present invention.

FIG. 2 is a circuit diagram of an isolated DC-DC converter 100 according to a preferred embodiment of the present invention. In FIG. 2, a transformer T1 includes a primary winding N1 and secondary windings N21 and N22. The primary winding N1 is connected to an inductor L1 and a switching circuit SW including four switching elements QA, QB, QC, and QD that define a bridge. A common mode choke coil CH, a filter circuit including by-pass capacitors C1 to C6, and a current transformer CT are disposed between an input power supply 1 and the switching circuit. A resistor R3 and a rectifying diode D3 are connected to a secondary side of the current transformer CT so that current flowing in a primary side of the current transformer is extracted as voltage signals. A circuit including this current transformer CT corresponds to a current detector according to a preferred embodiment of the present invention.

The four switching elements QA to QD of the switching circuit SW are connected to a driving circuit 11. This driving circuit 11 corresponds to a switching controller according to a preferred embodiment of the present invention.

The secondary windings N21 and N22 of the transformer T1 are connected to a rectifying/smoothing circuit including rectifying diodes D1 and D2, an inductor L2, and a capacitor C7. The rectifying/smoothing circuit outputs voltage to output terminals T21 and T22. A load circuit 2 is disposed between the output terminals T21 and T22. In addition, an output-voltage detecting circuit including resistors R1 and R2 is disposed between the output terminals T21 and T22.

A digital control circuit 10 is configured to preferably include a DSP (digital signal processor). This digital control circuit 10 operates as follows.

The digital control circuit outputs control pulses for the switching circuit SW to a pulse transformer T2. With this, the driving circuit 11 receives the control pulses via the pulse transformer T2, and drives the switching elements QA to QD of the switching circuit SW.

The driving circuit 11 controls the phases of the control pulses output from the pulse transformer T2 on the basis of timings at which the pulses rise and fall, and alternately switches on/off a set of the switching elements QA and QD and a set of the switching elements QB and QC.

Since only the control pulses output from the digital control circuit are transmitted to a primary side of the transformer using the pulse transformer T2 that isolates a secondary side of the transformer from the primary side as described above, the pulse transformer does not easily deteriorate with time.

When the number of turns of the primary winding N1 of the transformer T1 is represented by N1, the number of turns of the secondary windings N21 and N22 is represented by N2, the output voltage is represented by Vo, the input power-supply voltage is represented by Vin, and the on-duty cycle of the switching circuit is represented by Don, the input power-supply voltage can be determined from the following relationship.

$$Vin = Vo(N1/N2)/Don \quad (1)$$

That is, since this converter is of the full-bridge type, the input power-supply voltage is in proportion to the output voltage, and the factor of proportionality is shown in Expression (1). Since the digital control circuit 10 itself determines the on-duty cycle of the switching circuit SW during controlling, the on-duty cycle is a known quantity. Therefore, the input power-supply voltage can be determined with high accuracy by calculating Expression (1).

In the example shown in FIG. 2, the digital control circuit 10 receives output voltage detection signals serving as analog signals, and converts the signals into digital data inside the circuit. However, an A/D converter can be disposed outside the circuit, and can be configured to output digital values of the output voltage to the circuit.

Although losses and the like are not considered in Expression (1), losses and the like are practically produced at the transformer T1. Therefore, correction calculation can be performed with consideration of the losses and the like for calculating more accurate input power-supply voltage.

Since the input power-supply voltage is also in proportion to the output voltage when a half-bridge circuit or a center-tap (push-pull) circuit is used instead of the full-bridge circuit, the input power-supply voltage can be similarly calculated using factors of proportionality in accordance with the types of the circuits.

When a high current flows in the load circuit 2, the current is often virtually impossible to be directly detected. Since the current flowing in the primary side can be detected using the current transformer CT in the circuit shown in FIG. 2, the digital control circuit receives the output voltage at the secondary side of the current transformer CT so as to detect the current flowing in the primary side, and calculates the current flowing in the secondary side on the basis of the current flowing in the primary side. Herein, the effective value of the current flowing in the primary side represented by Iin and that of the current flowing in the secondary side represented by Io, have the following relationship when losses are disregarded.

$$Io = Iin(N1/N2) \quad (2)$$

The output current Io can be determined by calculating above.

The digital control circuit detects the output voltage Vo on the basis of the signals from the output-voltage detecting circuit including the resistors R1 and R2, converts the signals into digital data inside of the circuit, and controls the on-duty cycle of the switching elements QA to QD of the switching circuit SW such that the data is maintained at a predetermined value.

The on-duty cycle of the switching elements QA to QD of the switching circuit SW is controlled such that the current Io flowing in the secondary side determined as described above is maintained at a predetermined constant value.

The digital control circuit 10 includes a port for communicating data with the load circuit 2 or inputting/outputting signals to/from the load circuit 2, and, for example, constantly sends information such as the state of the converter to the load circuit (electronic device) and receives information such as the load state of the load circuit so that the information is reflected in the switching control.

Figure 3:
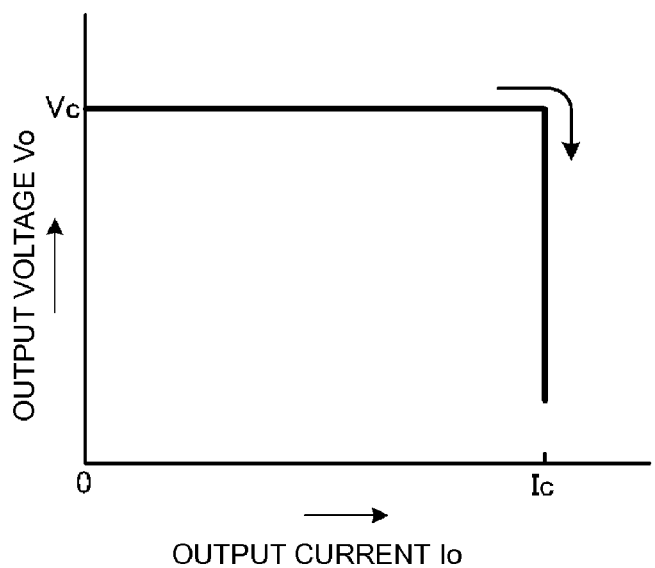
FIG. 3 illustrates the overcurrent protection characteristic of the isolated DC-DC converter.

FIG. 3 illustrates the overcurrent protection characteristic of the isolated DC-DC converter shown in FIG. 2. The output voltage Vo is maintained at a predetermined constant voltage Vc by the constant voltage control until the output current Io reaches an upper limit Ic.

When the output current Io attempts to exceed the upper limit Ic, the control mode is changed to constant current control, and the output voltage Vo is reduced. This leads to the drooping characteristic shown in FIG. 3.

In the example shown in FIG. 2, the pulse transformer T2 is used as the isolation member that is arranged to transmit the control pulses output from the digital control circuit 10 to the primary side while isolating the secondary side from the primary side. However, a photocoupler can be used for the isolation instead. That is, since only the control pulses output from the digital control circuit 10 need to be transmitted while the secondary side is isolated from the primary side, the photocoupler can be used with negligible effects of deterioration with time. Moreover, when the photocoupler is used, the photocoupler can save space compared with the pulse transformer.

Figure 4A:
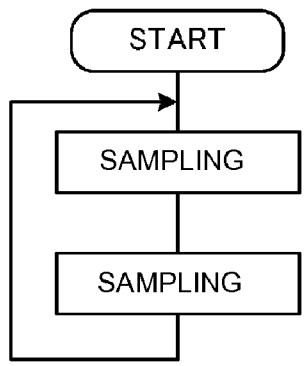
FIGS. 4A and 4B are flow charts illustrating processes performed by a control circuit of the isolated DC-DC converter.
Figure 4B:
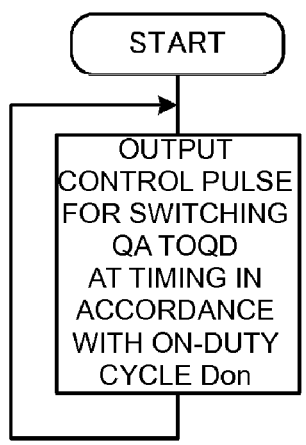
Figure 5:
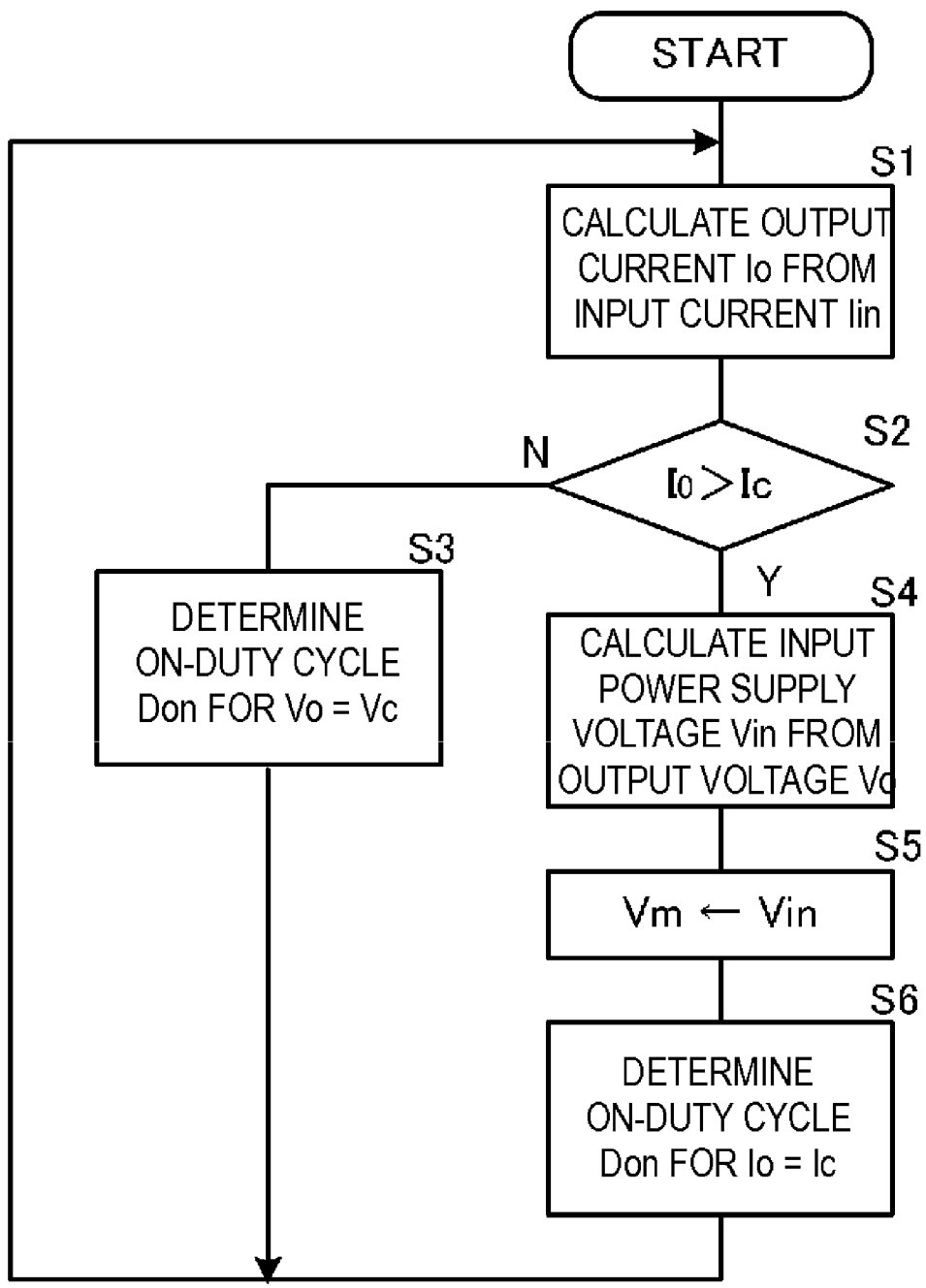
FIG. 5 is a flow chart illustrating processes performed by the control circuit of the isolated DC-DC converter for constant voltage control, constant current control, and overcurrent protection control.

FIGS. 4A to 5 are flow charts illustrating the major control contents of the digital control circuit 10.

During predetermined sampling periods, the input current Iin is determined by sampling the voltage from the current transformer CT, and the output voltage Vo is determined by sampling the output voltage from the output-voltage detecting circuit as shown in FIG. 4A.

Moreover, as shown in FIG. 4B, when the on-duty cycle Don of the switching circuit SW is determined, the control pulses for switching the switching elements QA to QD at timings in accordance with the on-duty cycle Don are output in synchronization with the switching frequency.

FIG. 5 illustrates procedures for the above-described constant voltage control, constant current control, and overcurrent protection control. First, the output current Io is calculated from the input current Iin using Expression (2) (S1). It is determined whether or not the output current Io exceeds the predetermined upper limit Ic. When the output current does not exceed the limit, the on-duty cycle Don for setting the output voltage Vo to the predetermined constant voltage Vc is determined (S2 to S3).

When the output current Io exceeds the upper limit Ic, the input power-supply voltage Vin is calculated from the output voltage Vo that exists when the output current exceeds the upper limit using Expression (1) (S4). The input power-supply voltage Vin at this moment is retained as the input power-supply voltage Vm that exists immediately before the overcurrent protection starts (S4 to S5). Subsequently, the on-duty cycle Don for setting the output current Io to the upper limit Ic is determined (S6). That is, the output voltage Vo may easily fluctuate since the output voltage is not controlled during the overcurrent protection. Accordingly, the input power-supply voltage Vin may not be stably determined on the basis of the output voltage. Therefore, the input power-supply voltage Vin immediately before the overcurrent protection starts is retained as data Vm, and is treated as being non-fluctuating from the value.

In general, a switching power-supply circuit is designed such that the power conversion efficiency thereof is maximized when the input power-supply voltage is a predetermined value. Therefore, when the input power-supply voltage noticeably deviates from the predetermined value, the power conversion efficiency is usually impaired. When the power conversion efficiency is reduced, the input current required for obtaining the same output voltage and the same output current to the load is increased. Therefore, in general, when the input power-supply voltage fluctuates, the operating point of the overcurrent protection circuit (point at which the control mode is switched to constant current control when the output current reaches a predetermined threshold) often fluctuates. Consequently, in order to maintain the operating point of the overcurrent protection circuit at a constant value even when the input power-supply voltage fluctuates, correction values in accordance with the value of the input power-supply voltage can be retained inside the digital control circuit in advance.

The output voltage Vo ($\approx$Vc) immediately before the overcurrent protection starts can be retained instead of retaining the input power-supply voltage Vin that was calculated, and the retained value can be substituted for Vo in Expression (1) so that the input power-supply voltage Vin is determined. Alternatively, correction values for the operating point of the overcurrent protection in accordance with the input power-supply voltage can be retained.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An isolated DC-DC converter comprising:
   a transformer including at least a primary winding and a secondary winding;
   a switching circuit connected to the primary winding of the transformer and arranged to switch an input power supply;
   a digital control circuit including a switching controller arranged to output control pulses to the switching circuit;
   a rectifying/smoothing circuit arranged to rectify and smooth an alternating voltage generated at the secondary winding of the transformer by switching the switching circuit and outputting an output voltage to an output terminal;
   an output-voltage detecting circuit arranged to detect the output voltage output via the rectifying/smoothing circuit; and
   an isolation member arranged to transmit the control pulses output from the digital control circuit to a primary side of the transformer while isolating a secondary side of the transformer from the primary side; wherein
   the digital control circuit is disposed at the secondary side of the transformer, and includes a receiving member arranged to receive signals detected by the output-voltage detecting circuit or digital values of the detected signals, and an input power-supply voltage calculating member arranged to calculate a voltage of the input power supply from at least an on-duty cycle of the control pulses, the output voltage, and a ratio of the number of turns of the primary winding to the number of turns of the secondary winding of the transformer.

2. The isolated DC-DC converter according to claim 1, wherein the switching circuit is a full-bridge circuit.

3. The isolated DC-DC converter according to claim 1, wherein the isolation member includes a pulse transformer arranged to transmit waveforms obtained by differentiating the control pulses to the primary side, and arranged to transmit only rising portions and falling portions of the control pulses to the primary side.

4. The isolated DC-DC converter according to claim 1, wherein the isolation member includes a photocoupler.

5. The isolated DC-DC converter according to claim 1, wherein the digital control circuit includes a port arranged to communicate with a load circuit connected to the output terminal.

6. The isolated DC-DC converter according to claim 1, wherein the digital control circuit includes a digital signal processor.

7. The isolated DC-DC converter according to claim 1, further comprising:
   a current detector arranged to detect current flowing in the primary side of the transformer; wherein
   the digital control circuit includes:
      a constant voltage controller programmed to perform constant voltage control in which the on-duty cycle is controlled such that the output voltage is maintained at a constant value;
      a constant current controller programmed to perform constant current control in which the on-duty cycle is controlled such that output current flowing in the output terminal is maintained at a constant value on the basis of the input power-supply voltage or the value of the output voltage, the current detected by the current detector, and the ratio of the number of turns of the primary winding to the number of turns of the secondary winding of the transformer;

an overcurrent protection member arranged to switch the control mode from the constant voltage control to the constant current control when the current detected by the current detector is higher than or equal to a predetermined value; and a voltage retaining member arranged to retain the input power-supply voltage that exists when it is determined that the current detected by the current detector is higher than or equal to the predetermined value.

* * * * *